United States Patent
Koga (10) Patent No.: US 7,425,064 B2
(45) Date of Patent: Sep. 16, 2008

(54) IMAGE-FORMING DEVICE (75) Inventor: Yuji Koga, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 360 days.

(21) Appl. No.: 10/963,714

(22) Filed: Oct. 14, 2004

(65) Prior Publication Data
US 2005/0088493 A1 Apr. 28, 2005

(30) Foreign Application Priority Data
Oct. 22, 2003 (JP) ............................. 2003-361655

(51) Int. Cl.
B41J 29/13 (2006.01)
B41J 2/17 (2006.01)
B41J 2/175 (2006.01)
(52) U.S. Cl. ............................. 347/108; 347/84; 347/85
(58) Field of Classification Search ................ 347/108, 347/138, 152, 170, 222, 2, 4, 84, 85, 31, 347/3; 400/691; 237/3
See application file for complete search history.

(56) References Cited

U.S. PATENT DOCUMENTS

| | | | | |
|---|---|---|---|---|
| 4,723,857 A | * | 2/1988 | Yokoi | 400/693 |
| 5,367,328 A | * | 11/1994 | Erickson | 347/7 |
| 5,489,925 A | * | 2/1996 | Brooks et al. | 347/6 |
| 5,499,043 A | * | 3/1996 | Osaka | 347/108 |
| 5,532,826 A | * | 7/1996 | Miyao et al. | 358/296 |
| 5,552,812 A | * | 9/1996 | Ebinuma et al. | 347/34 |
| 5,619,240 A | * | 4/1997 | Pong et al. | 347/103 |
| 5,717,443 A | | 2/1998 | Numata et al. | |
| 5,774,154 A | * | 6/1998 | Underwood | 347/85 |
| 5,774,764 A | * | 6/1998 | Toyokura et al. | 399/77 |
| 5,800,084 A | * | 9/1998 | Sawada et al. | 400/208 |
| 5,923,438 A | * | 7/1999 | Fujiwara | 358/401 |
| 5,988,809 A | | 11/1999 | Yokoi et al. | |
| 6,195,170 B1 | * | 2/2001 | Mizutani et al. | 358/1.14 |
| D480,732 S | * | 10/2003 | Hattori et al. | D14/469 |
| 6,712,446 B1 | * | 3/2004 | Huffman | 347/19 |
| 6,961,152 B1 | * | 11/2005 | Watanabe et al. | 358/296 |

(Continued)

FOREIGN PATENT DOCUMENTS

JP A-06-178057 6/1994

(Continued)

Primary Examiner—Stephen D Meier
Assistant Examiner—Leonard S Liang
(74) Attorney, Agent, or Firm—Oliff & Berridge, PLC (57) ABSTRACT In an image-forming device, an image scanning device and a control panel are arranged in a row on the top surface of a main casing. Below the image scanning device and the control panel, an ink accommodating unit, a paper conveying path having a conveying mechanism, and a recording unit are positioned in the surface area of the image scanning device and the control panel projected in a plan view. A paper cassette is disposed below the ink accommodating unit and the paper conveying path. A main partitioning plate is disposed in a substantially level state for covering the top of the paper conveying path leading to the bottom of the recording unit. The top surface of the main partitioning plate is formed as a support surface for supporting at least a portion of ink supply tubes that supply ink from the ink accommodating unit to the recording head.

16 Claims, 6 Drawing Sheets

U.S. PATENT DOCUMENTS

| | | | |
|---|---|---|---|
| 6,991,313 B2 * | 1/2006 | Sasa | 347/29 |
| 7,162,196 B2 * | 1/2007 | Zampell | 399/407 |
| 7,213,909 B2 * | 5/2007 | Sekiya | 347/66 |
| 2002/0080426 A1 * | 6/2002 | Ito | 358/498 |
| 2003/0184771 A1 * | 10/2003 | Yamamoto et al. | 358/1.7 |
| 2003/0206224 A1 * | 11/2003 | Sakakibara et al. | 347/108 |

FOREIGN PATENT DOCUMENTS

| | | |
|---|---|---|
| JP | A-07-251998 | 10/1995 |
| JP | A-08-110660 | 4/1996 |
| JP | B2-2714050 | 10/1997 |
| JP | B2-2899149 | 3/1999 |
| JP | B2-3262356 | 12/2001 |

* cited by examiner

IMAGE-FORMING DEVICE

BACKGROUND OF THE INVENTION

1. Field of the Invention

The present invention relates to an inkjet-type image-forming device, and particularly to an image-forming device configured to supply ink from ink cartridges to a recording head via ink supply tubes, where the ink cartridges are arranged at stationary positions in a main casing of the image-forming device and the recording head travels in a reciprocating motion. The present invention also relates to such an image-forming device having a flat, compact main casing.

2. Related Art

Japanese unexamined patent application No. HEI-8-110660 discloses a compact multifunction-type image-forming device including a copier function, a facsimile function, and the like. In this image-forming device, a paper supply cassette is detachably mounted in a bottom section of a main casing through the front side thereof. A recording unit includes a carriage, which supports ink cartridges and a print head, disposed in the rear section of the main casing. The carriage is capable of reciprocating movement in a substantially horizontal direction orthogonal to a direction in which paper is conveyed (discharged). After an image is recorded on paper, the paper is discharged from the main casing through a discharge opening formed in the rear side of the main casing. A contact glass is provided on the top surface of the main casing. A scanning mechanism is disposed above the paper supply cassette and includes a reciprocating scanning sensor that moves parallel to the direction in which the carriage moves for scanning text and images of an original document placed facedown on the contact glass. Alternatively, an automatic feeder is provided for conveying sheets of the original document over the contact glass to be scanned.

U.S. Pat. No. 5,717,443 corresponding to Japanese Patent No. 3262356 discloses an image-forming device having a paper supply cassette that is detachably mounted in a bottom section of a main casing through a front side thereof and a recording unit including a reciprocating carriage, which supports ink cartridges and a print head. The carriage moves in a substantially horizontal direction orthogonal to a direction for conveying (discharging) paper. After an image has been recorded on paper, the paper is discharged diagonally upward via a discharge opening formed in the rear side of the main casing.

Japanese unexamined patent application publication No. HEI-7-251998 discloses an image-forming device having an original loading tray disposed on the top surface of a main casing and slanting downward toward the front of the same, and a scanning unit including contact sensors and the like disposed near the top front section in the main casing. A paper supply cassette is detachably mounted in a bottom section of the main casing through the front side thereof. A carriage, which supports ink cartridges and a print head, is disposed in the rear section of the main casing. The ink cartridges are arranged at a slant to the horizontal plane. In this image-forming device, paper is conveyed upward at a slant of less than 45 degrees to the vertical. A discharge tray is disposed on the rear end of the main casing and slants upward toward the rear.

SUMMARY OF THE INVENTION

In the image-forming devices of Japanese unexamined patent application No. HEI-8-110660 and U.S. Pat. No. 5,717,443, the ink cartridges are mounted in and removed from the print head on top of the carriage in a vertical direction. Hence, space is required above the carriage for mounting the ink cartridges along the direction of the movement of the carriage, thereby increasing the height of the main casing.

In the image-forming device according to Japanese unexamined patent application No. HEI-8-110660, parts of the moving carriage protrude outside of the contact glass when projected in a plan view. Therefore, the surface area of the image-forming device in a plan view increases, and a compact image-forming device cannot be produced.

In the image-forming device disclosed in Japanese unexamined patent application publication No. HEI-7-251998, the ink cartridges are disposed at a slant to the horizontal plane, and parts of the moving carriage protrude outside the surface area of the scanning unit when projected in a plan view. Hence, the main casing is bulky with a large front-to-rear dimension.

In the view of foregoing, it is an object of the present invention to overcome the above problems, and also to provide a compact image-forming device with a low height and a small surface area when projected in a plan view.

In order to attain the above and other objectives, according to one aspect of the present invention, there is provided an image-forming device including a main casing, a medium accommodating unit that is disposed in a bottom section of the main casing and accommodates a recording medium, a conveying mechanism that conveys the recording medium in a first direction, a recording unit that is disposed at a position higher than the medium accommodating unit and includes an inkjet head that reciprocally moves in a second direction perpendicular to the first direction, an ink accommodating unit disposed above the medium accommodating unit, such that at least a portion of the height dimension of the ink accommodating unit falls within the height dimension of the recording unit, and an ink supply tube. The ink accommodating unit accommodates ink. The ink accommodated in the ink accommodating unit is supplied to the print head through the ink supply tube. The conveying mechanism is disposed between the recording unit and the ink accommodating unit and conveys the recording medium from the medium accommodating unit toward the bottom of the inkjet head.

PREFERRED EMBODIMENTS OF THE PRESENT INVENTION

An image-forming device according to preferred embodiments of the present invention will be described while referring to the accompanying drawings.

An image-forming device 1 according to a first embodiment is a multifunction device that includes a printer function, a copier function, a scanner function, and a facsimile function.

Figure 1:
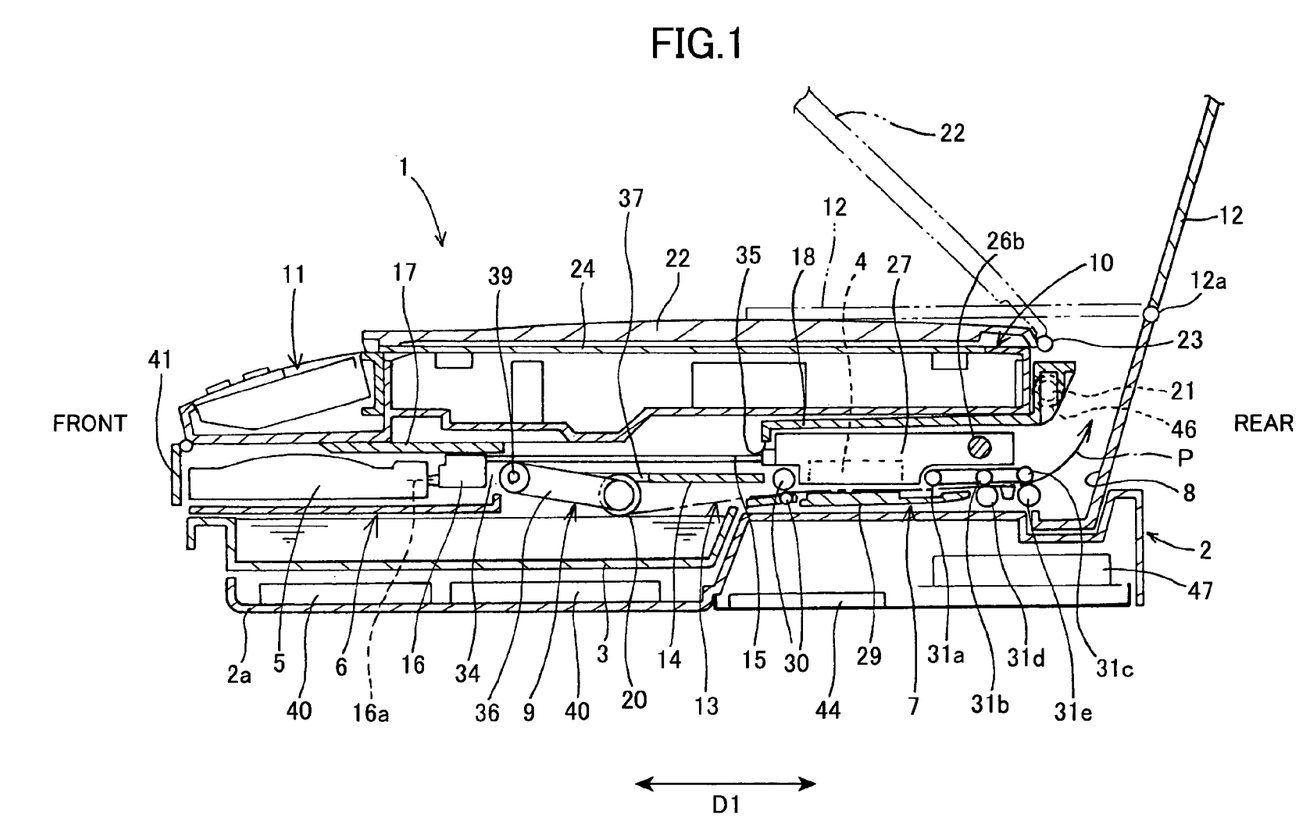
FIG. 1 is a side cross-sectional view of an image-forming device according to a first embodiment of the present invention.

As shown in FIG. 1, the image-forming device 1 includes a main casing 2 formed of a synthetic resin that includes a bottom plate 2a. A paper cassette 3 is mounted on top of the bottom plate 2a and can be pulled out of (detached from) the main casing 2 through the front side thereof. In the this embodiment, the paper cassette 3 can accommodate a plurality of sheets of a paper P cut to the A4 size, for example, and stacked so that the shorter sides are parallel to a paper conveying direction D1, which is the front-to-rear direction of the main casing 2.

A space is formed in a bottom rear section of the main casing 2 for accommodating a drive motor (not shown), a circuit board 44 provided for control, and the like.

Figure 2:
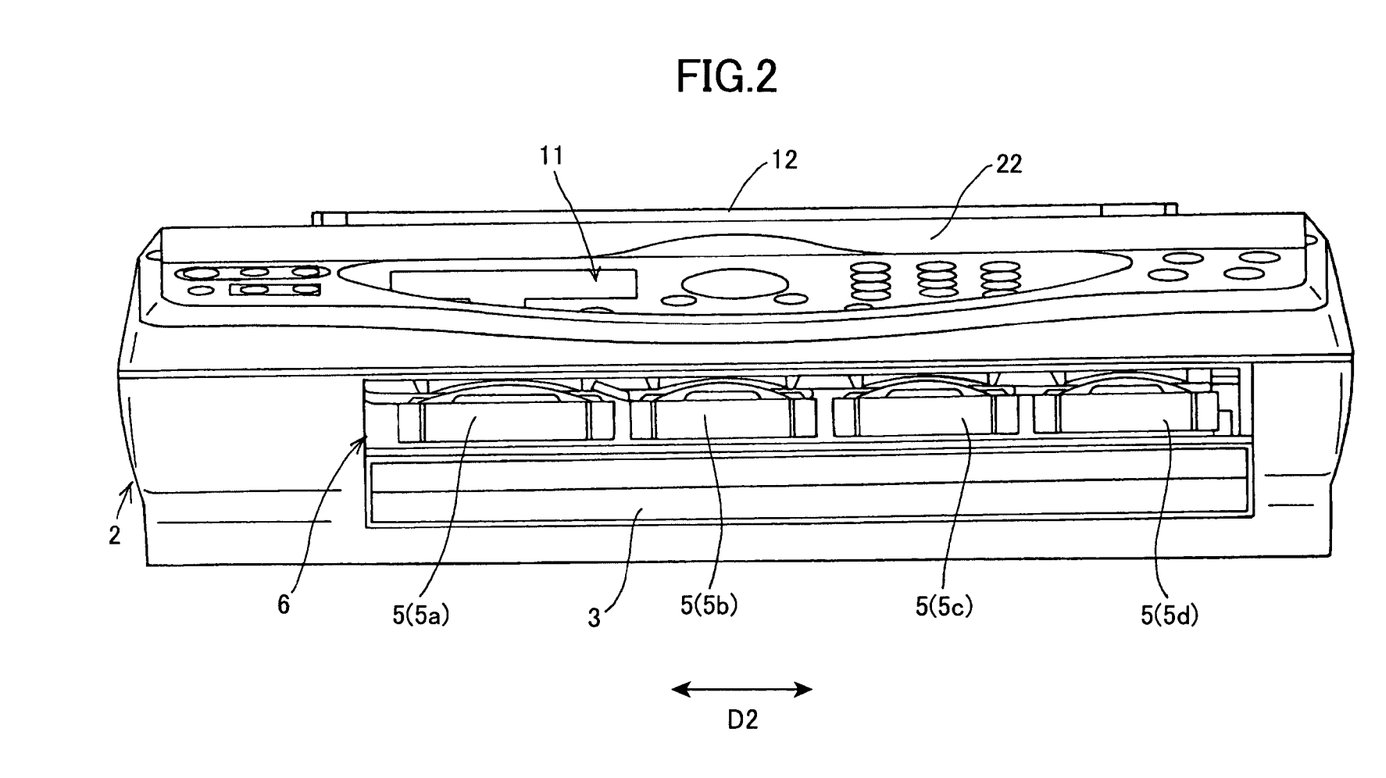
FIG. 2 is a front view of the image-forming device of FIG. 1.
Figure 3:
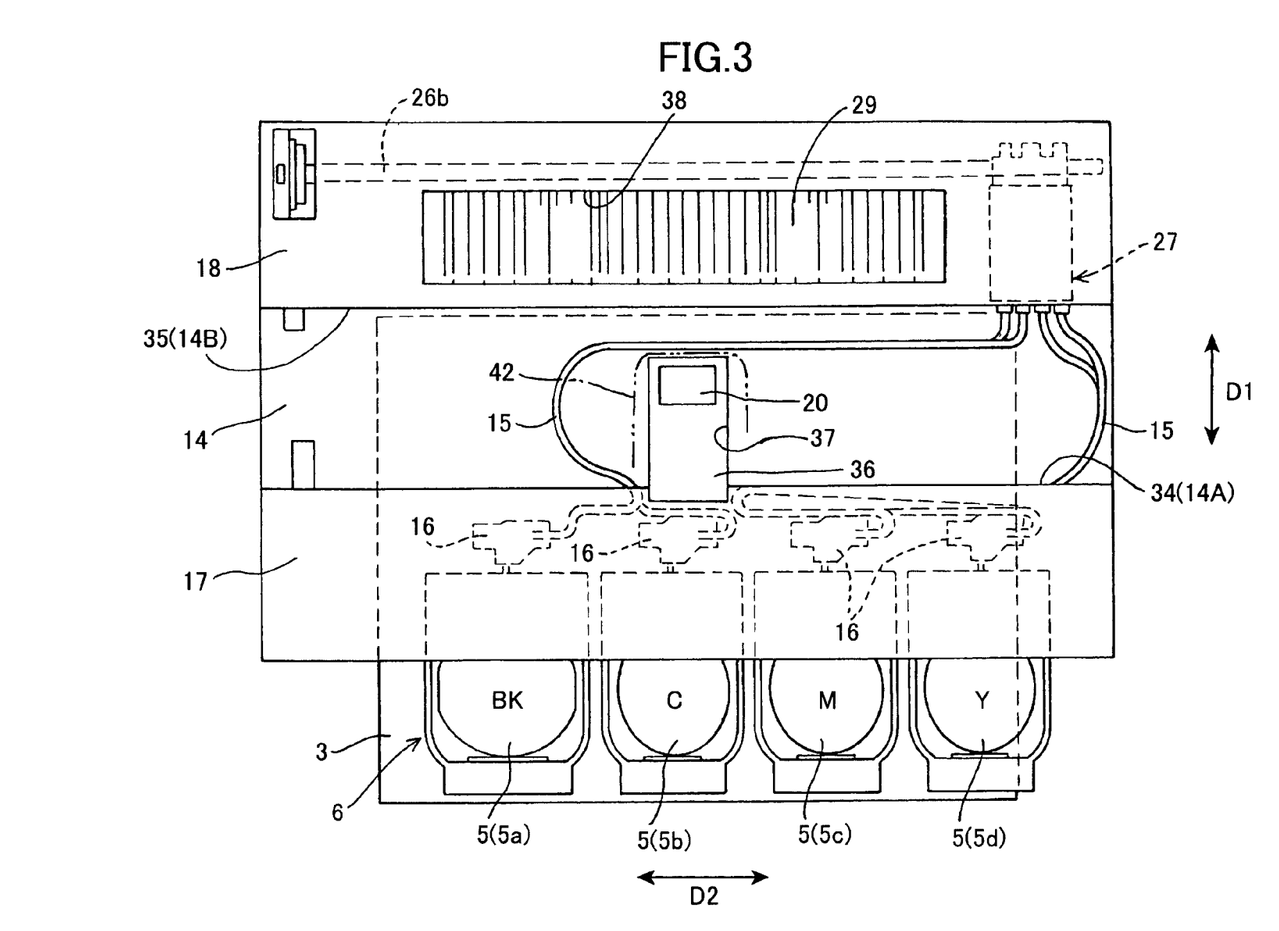
FIG. 3 is a plan view of a recording unit and the like of the image-forming device in which a partitioning plate is provided.

An ink accommodating unit 6 is provided above the paper cassette 3 in a section near the front of the main casing 2. As shown in FIGS. 2 and 3, the ink accommodating unit 6 can accommodate a row of four ink cartridges 5 (5a-5d) in a lateral direction D2 orthogonal to the paper conveying direction D1. Each of the ink cartridges 5 accommodates ink of one of the four colors black (BK), cyan (C), magenta (M), and yellow (Y) for printing in full color.

The ink cartridges 5 are flat in shape with a low height dimension and a large surface area in a plan view. The ink cartridges 5 are inserted into and removed from the ink accommodating unit 6 through the front side of the main casing 2.

More specifically, as shown in FIG. 1, a cover 41 that can open and close is provided on the front surface of the ink accommodating unit 6. A portion of the ink cartridges 5 is exposed by the cover 41. To replace an ink cartridge 5, therefore, the user grips a desired ink cartridge 5 when the cover 41 is open and removes the ink cartridge 5 through the front part of the ink accommodating unit 6. Subsequently, the user inserts a new ink cartridge 5 into the ink accommodating unit 6 and closes the cover 41.

Marks (not shown), such as labels or colors, may be provided at positions in which the ink cartridges 5a-5d are mounted so as to indicate the required ink color. Such marks can facilitate the user in mounting the correct ink cartridges 5 in the ink accommodating unit 6, particularly when the cover 41 is opened and no ink cartridges 5 are mounted at that time.

When using many ink colors (6-8 colors for example), the ink accommodating unit 6 may be configured to mount a number of ink cartridges corresponding to the number of ink colors.

A recording unit 7 for implementing the printer function and the like is disposed above and behind the paper cassette 3. A discharging unit 8 is formed on the rear end of the main casing 2 for discharging the paper P recorded in the recording unit 7 upward. A discharge tray 12 is also disposed on the rear end of the main casing 2 and can pivot (fold out or fold up) about a shaft 12a to change between a first position indicated by solid lines in FIG. 1 and a second position indicated by broken lines in FIG. 1. More specifically, in the first position, the discharge tray 12 is erected from the rear end of the main casing 2 and slants rearward (approximately 15-20 degrees to the vertical). In the second position, the discharge tray 12 lies on the top surface of a cover 22 (described later) in a substantially horizontal position.

When the discharge tray 12 is in the first position, a sheet of paper P discharged from the discharging unit 8 after an image has been recorded in the recording unit 7 is placed on the discharge tray 12 with the image facing frontward. As a result, the user can quickly and easily confirm the image recorded on the paper P from the front side of the main casing 2. Further, since the discharging unit 8 discharges the printed paper P upward, the discharge tray 12 does not protrude far rearward from the rear edge of the main casing 2, thereby decreasing the required surface area for placing the image-forming device 1.

On the other hand, when the discharge tray 12 is in the second position, the paper P discharged from the discharging unit 8 after an image has been recorded in the recording unit 7 is placed on the cover 22 with the image facedown, that is, so that the recorded surface of the paper P is on the bottom. Since a prescribed interval is formed between the discharge tray 12 and the cover 22, the paper P is placed between this gap. As a result, when images are recorded on a plurality of sheets of the paper P, the sheets of paper P are stacked facedown on the cover 22 in the order in which they were recorded, thereby assisting the user in organizing the paper P. When the discharge tray 12 is maintained in the second position, the image-forming device 1 is even further compact.

A power source 47 is provided below the discharging unit 8. Accordingly, heat emitted from the power source 47 promotes drying of the paper P resting on the discharge tray 12 in the first position.

A feeding mechanism 9 is provided above the paper cassette 3 between the ink accommodating unit 6 and the recording unit 7. The feeding mechanism 9 includes a feeding roller 20 and the like for separating the sheets of paper P stacked on the paper cassette 3 one sheet at a time and feeding each sheet toward the bottom of the recording unit 7 along a paper conveying path 13.

An image scanning device 10 for implementing the copier function and the like and a control panel 11 including various operating buttons, a liquid crystal display, and the like are arranged in a row on the top of the main casing 2. All of the ink accommodating unit 6, the feeding mechanism 9, the paper conveying path 13 for conveying the paper P from the paper cassette 3 to the recording unit 7, and the recording unit 7 are positioned within an area projected by the image scanning device 10 and the control panel 11 in a plan view.

Figure 5:
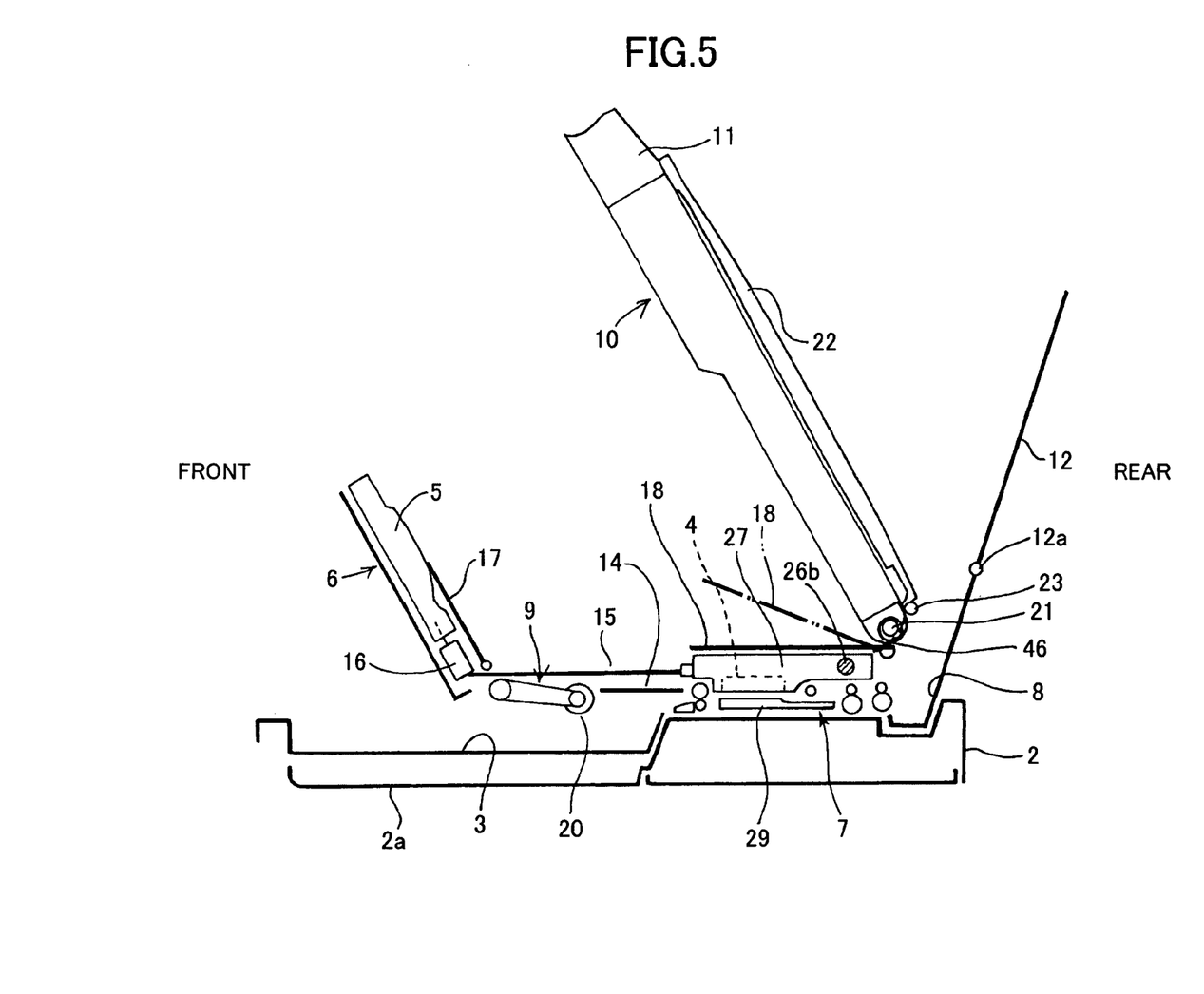
FIG. 5 is a side cross-sectional view of an image scanning device, a control panel, and an ink accommodating unit in an open state facing upward.

As shown in FIG. 5, a pivoting support 21 is provided on the rear edge of the image scanning device 10 so that the image scanning device 10 and the control panel 11 can swing together up and down about the pivoting support 21. A torsion spring 46 is wound about the shaft portion of the pivoting support 21 for fixing the image scanning device 10 at an upwardly pivoting position. With this construction, the front side on the top surface of the main casing 2 can be maintained in a wide open state, enabling the user to release the image scanning device 10 and the like in order to facilitate replacement of the ink cartridges 5, clearing of paper jams, and performing of cleaning operations in the main casing 2. The mechanism for fixing the image scanning device 10 and the control panel 11 in the upwardly pivoted position may also be configured of another construction well known in the art, such as a telescopic damper mounted between the main casing 2 and the image scanning device 10.

As shown in FIG. 1, a pivot support 23 is also provided on the rear edge of the cover 22 about which the cover 22 can open on top of the image scanning device 10. A glass plate 24 is provided on top of the image scanning device 10 for placing an original document.

The glass plate 24 has an original-document mounting area on which an original document is placed. The original document mounting area is a rectangular area having longer sides extending parallel with a front side of the glass plate 24.

Although not shown in the drawings, a contact image sensor (CIS), for example, serving as sensors and an image scanning unit is provided beneath the glass plate 24 so that the longer side of the CIS is parallel to the front-to-rear direction D1 of the main casing 2. The CIS scans an original document placed on the glass plate 24 while reciprocally moving left and right, that is, in a direction parallel to the reciprocal movement of a carriage 27 (described later).

Because the longer sides of an original document placed on the glass plate 24 is parallel with the longer sides of a sheet of paper P accommodated in the paper cassette 3, the paper cassette 3 can be positioned within the area projected by the control panel 11 and the image scanning device 10 in a plan view, and an projected area of the paper cassette 3 and an projected area of the recording unit 7 do not overlap each other in a plan view.

Figure 4:
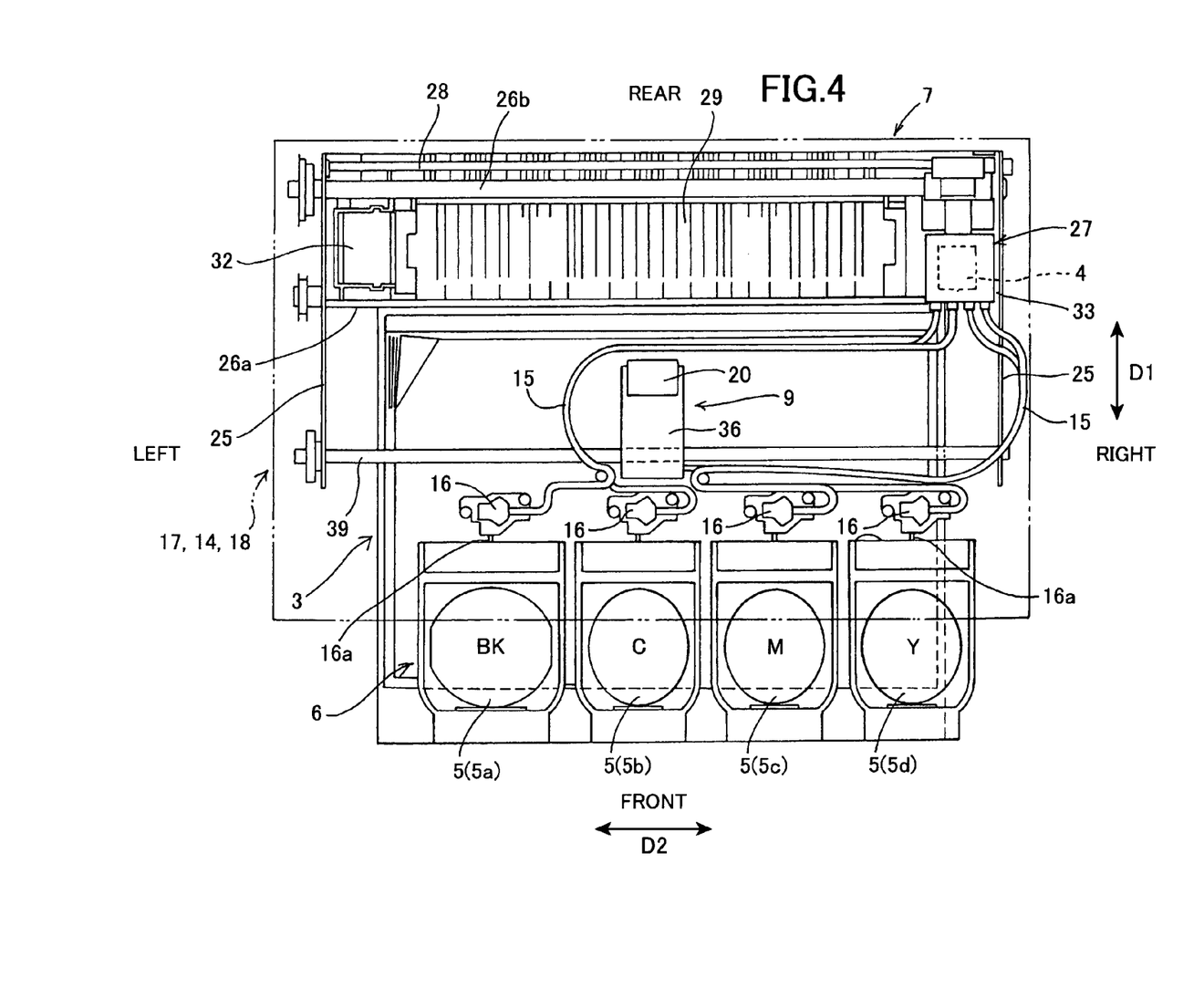
FIG. 4 is a plan view of the recording unit and the like of the image-forming device in which the partitioning plate has been removed.

As shown in FIG. 4, the image-forming device 1 further includes a pair of left and right side plates 25 serving as a main frame. The recording unit 7 includes a guide rail 26a, a guide shaft 26b, the carriage 27, a recording head 4, a timing belt 28, and a platen 29. The guide rail 26a and the guide shaft 26b extend between the side plates 25 in the lateral direction D2. The carriage 27 is slidably mounted on the guide rail 26a and the guide shaft 26b, while the recording head 4 is mounted on the carriage 27. The timing belt 28 extends parallel to the guide shaft 26b and functions to move the carriage 27 reciprocatingly. The platen 29 is a plate-shaped member for supporting the paper P conveyed along the bottom surface of the recording head 4. The recording unit 7 also includes a stepping motor (not shown in the drawings) for driving the timing belt 28.

The recording head 4 is an inkjet-type recording head that is constantly connected with each of the ink cartridges 5 by flexible ink supply tubes 15. Although not shown in the drawings, the recording head 4 includes a row of nozzles for each color (four rows in this embodiment), and actuators, such as flat piezoelectric elements, bonded to the top surface of each nozzle. The row of nozzles for each color extends in a direction (paper conveying direction D1) orthogonal to the moving direction of the carriage 27 (lateral direction D2). The recording head 4 of this embodiment is for distributing supplied ink to pressure chambers communicating with the respective nozzles. The actuators are provided in correspondence with the respective pressure chambers and eject ink onto the top surface of the paper P through the nozzles.

As shown in FIG. 1, a pair of registration rollers 30 is disposed on the upstream side of the platen 29 in the paper conveying direction D1 for conveying the paper P along the bottom surface of the recording head 4. Further, a first spur 31a, a second spur 31b, and a third spur 31c that contact the top surface of the paper P and discharge rollers 31d and 31e corresponding respectively to the second spur 31b and the third spur 31c are disposed downstream of the platen 29 in the paper conveying direction D1 for conveying the paper P to the discharging unit 8 after an image had been recorded on the paper P.

As shown in FIG. 4, an ink receptacle 32 is disposed on one side of the image-forming device 1 (near the side plate 25 on the left side in this embodiment) and outside the widthwise range of the conveyed paper P (along the long side of the paper P). A maintenance unit 33 is disposed at a print head standby position on the other side of the image-forming device 1 (near the side plate 25 on the right side in this embodiment). Periodically during recording operations, the recording head 4 moves to a prescribed flushing position corresponding to the ink receptacle 32 and ejects ink into the ink receptacle 32 in order to prevent clogging of the nozzles.

The maintenance unit 33 cleans the nozzle surfaces in the recording head 4 and performs recovery processes and the like to selectively withdraw ink for each color in order to remove bubbles from buffer tanks (not shown) in the recording head 4.

As shown in FIG. 1, sheet-like ink absorbers 40 are disposed on the bottom plate 2a of the main casing 2 below the paper cassette 3. The ink absorbers 40 absorb and hold waste ink discharged from the recording head 4 during maintenance or recovery processes when the waste ink leaks, preventing the ink from contaminating the inside of the main casing 2. The ink absorbers 40 also absorb and hold ink that leaks by mistake when replacing the ink cartridges 5, thereby keeping the inside of the main casing 2 clean.

As shown in FIGS. 1 and 3, the image-forming device 1 also includes a main partitioning plate 14, a front cover plate 17, and a rear cover plate 18 all provided under the image scanning device 10. The main partitioning plate 14 is disposed at a lower position than the front cover plate 17 and the rear cover plate 18.

More specifically, the main partitioning plate 14 is disposed between the ink accommodating unit 6 and the recording unit 7 so as to cover the top of the paper conveying path 13. In this embodiment, the main partitioning plate 14 is formed so that the paper conveying path 13 is contained within the area projected by the main partitioning plate 14 in a plan view.

The ink supply tubes 15 are provided along the top surface of the main partitioning plate 14 so that at least a portion (middle parts or the like) of the ink supply tubes 15 are supported on the top surface of the main partitioning plate 14.

A window 37 is formed through the main partitioning plate 14 at approximately the left-to-right center thereof so that the main partitioning plate 14 does not impede the feeding roller 20 or the vertical movement of a pivot arm 36 supporting the feeding roller 20. A driving shaft 39 spans between the left and right sides of the main frame and engages with gears (not shown) inside the pivot arm 36. An electromotive force transferred through these gears rotates the feeding roller 20.

The ink supply tubes 15 and the ink cartridges 5 are connected via connecting units 16. The front cover plate 17 is continuously formed with the main partitioning plate 14 via a step part 14A on the front end of the main partitioning plate 14 so as to cover the connecting units 16 and the rear half of the ink accommodating unit 6. An opening 34 elongated in the left-to-right direction D2 is formed between the rear edge of the front cover plate 17 and the front edge of the main partitioning plate 14. The ink supply tubes 15 extend through the opening 34 and across the top surface of the main partitioning plate 14.

As shown in FIG. 5, the ink accommodating unit 6 and the front cover plate 17 may be configured to swing up and down about the rear edge thereof. Swinging the ink accommodating unit 6 and the front cover plate 17 upward exposes at least a portion on the top surface of the paper cassette 3 (the front half of the paper cassette 3), facilitating reloading of paper P in the paper cassette 3 and clearing of paper jams in the paper cassette 3 without having to pull the paper cassette 3 far forward from the main casing 2.

The rear cover plate 18 is continuously formed with the rear edge of the main partitioning plate 14 via a step part 14B (FIG. 3) in order to cover substantially the entire top of the recording unit 7. An opening 35 (FIG. 3) elongated in the left-to-right direction D2 is formed in the step part 14B between the front edge of the rear cover plate 18 and the rear edge of the main partitioning plate 14. The rear ends of the ink supply tubes 15 are connected to the recording head 4 via the opening 35 (see FIG. 4) and pass through the opening 35 as the carriage 27 moves left and right. A window 38 (FIG. 3) elongated left-to-right is formed through the rear cover plate 18. The user can insert the user's fingers or hands through the window 38 to remove the paper P when a paper jam occurs above the platen 29, thereby greatly facilitating the clearing of paper jams.

The rear cover plate 18 is configured to swing up and down as indicated by a dotted line in FIG. 5, so as to expose the top surface of the recording unit 7. Exposing the top surface of the recording unit 7 further facilitates the clearing of paper jams above the platen 29 and the like.

In this embodiment, a "movement area" is the area in which the middle portions of the ink supply tubes 15 move while being supported on the top surface of the main partitioning plate 14, as the reciprocating carriage 27 moves left and right. The lengths of the ink supply tubes 15 and the mounting position of the ink accommodating unit 6 are determined so that the position of the window 37 does not overlap the movement area in a plan view. In this embodiment, the window 37 is formed through the main partitioning plate 14 in substantially the center with respect to the lateral direction D2, and two of the ink cartridges 5 are disposed on each of the left and right sides of the window 37. Two of the ink supply tubes 15 corresponding to the ink cartridges 5a and 5b for black (BK) and cyan (C) inks are bound together in their middle portions in a vertically stacked state, and these ink supply tubes 15 pass through the left side of the window 37 and connect to the front edge of the recording head 4 downstream of the paper conveying path 13 in the paper conveying direction D1. Similarly, two of the ink supply tubes 15 corresponding to the ink cartridges 5c and 5d for magenta (M) and yellow (Y) inks are bound together in their middle portions in a vertically stacked state, and these ink supply tubes 15 pass through the right side of the window 37 and connect to the front edge of the recording head 4 downstream of the paper conveying path 13 in the paper conveying direction D1. While the carriage 27 is positioned on the right side in FIGS. 3 and 4, the lengths of the ink supply tubes 15 must be set so that the middle portions of the ink supply tubes 15 do not cross over the window 37 but are positioned outside the peripheral edge of the window 37, even when the carriage 27 is positioned at the maximum left and right edges in its range of movement.

With this construction, a part of the feeding mechanism 9 protruding above the window 37 (the pivot arm 36 or the feeding roller 20) and the movement of the ink supply tubes 15 do not interfere with each other. Since the operations of the feeding mechanism 9 are not impeded by the moving ink supply tubes 15, the ink supply tubes 15 and the feeding mechanism 9 can be arranged at approximately the same height (in approximately the same horizontal plane), enabling the production of a thinner overall image-forming device 1.

Since the paper conveying path 13 and the movement area of the ink supply tubes 15 are set to substantially overlap when projected in a plan view, the surface area required for the main casing 2 of the image-forming device 1 projected in a plan view can be reduced, enabling the production of an even more compact image-forming device 1.

As shown in FIG. 3, a guard piece 42 substantially U-shaped in a plan view is erected from the top surface of the main partitioning plate 14 as indicated by a dotted line. The guard piece 42 surrounds the periphery of the window 37, preventing the middle portions of the ink supply tubes 15 from crossing over the window 37. Hence, the middle portions of the ink supply tubes 15 are prevented from becoming entangled with the feeding roller 20 and the pivot arm 36 pivoting up and down, thereby preventing damage to the ink supply tubes 15. Further, the ink supply tubes 15 can be distributed on both the left and right sides of the window 37, enabling a reduction in the height of the space required for the reciprocating movement of the ink supply tubes 15.

While not shown in the drawings, a membrane nearly entirely flexible is attached inside each ink cartridge 5 for partitioning an ink accommodating chamber in the bottom of the ink cartridge 5 from an air chamber in the top of the ink cartridge 5. Further, an air hole penetrates a surface of each ink cartridge 5, that faces the rear of the image-forming device 1 when the ink cartridge 5 is mounted (hereinafter referred to as the "insertion side wall of the ink cartridge 5"), so the air chamber is in fluid communication with the outside air. A sealing member formed of silicone or the like for separating the ink accommodating chamber from the external air is also mounted over the insertion side wall of the ink cartridge 5.

As shown in FIG. 4, a hollow ink needle 16a horizontally protrudes from the front surface of each connecting unit 16 and opposes the approximate center of the insertion side wall of the ink cartridge 5 for each color. A needle hole is formed in the side surface of the ink needle 16a near the tip. When the ink cartridge 5 is mounted in the ink accommodating unit 6, the ink needle 16a is inserted into the sealing member of the ink cartridge 5 until the needle hole in the ink needle 16a reaches inside the ink accommodating chamber. The base end of the ink needle 16a corresponding to each color of ink is connected to the corresponding ink supply tube 15 via a buffer tank in the connecting unit 16 for supplying ink to the recording head 4. The buffer tank temporarily accommodates ink supplied via the ink needle 16a and functions to filter foreign matter from the ink.

An air feed unit (not shown) may be provided if the surface of nozzles in the recording head 4 are positioned higher than the ink surface in the ink cartridges 5 by a prescribed head differential. The air feed unit supplies pressurized (positive pressure) air to the air chamber in each ink cartridge 5 during maintenance operations, for example, and is configured to apply a positive pressure to the ink in each ink accommodating chamber, thereby preventing the meniscus of the ink from breaking when a cap is separated from the nozzle surfaces after the maintenance operation.

In the image forming device 1 having the above-described configuration, the paper cassette 3 is detachably mounted in the bottom section of the main casing 2 through the front surface of the main casing 2. The recording unit 7 is positioned higher than the paper cassette 3 so that the inkjet-type recording head 4 can move in a reciprocating direction orthogonal to the conveying direction of the paper P. Further, the ink accommodating unit 6 is disposed at a position above the paper cassette 3 so that at least a portion of the height dimension of the ink accommodating unit 6 for accommodating the ink cartridges 15 is within the height dimension of the recording unit 7. Moreover, ink is supplied from the ink cartridges 15 to the recording head 4 via the ink supply tubes 15. Therefore, the recording unit 7 can be set to a lower height than the conventional image-forming device in which the ink cartridges travel in a reciprocating motion while mounted on the recording head.

Because the ink cartridges 5 are formed flat with a large surface area in a plan view and a low height dimension, the height dimension of the main casing 2 can be further reduced to form a compact device. Further, dust does not enter and, therefore, tends not to accumulate in the recording unit 7 when loading paper P into the paper cassette 3 because the paper cassette 3 is inserted and removed through the front surface of the main casing 2 at a position below the ink accommodating unit 6 and the recording unit 7.

The space between the recording unit 7 and the ink accommodating unit 6 can be effectively used by positioning the feeding mechanism 9 therebetween for feeding the paper P from the paper cassette 3 and conveying the paper P toward the bottom of the recording unit 7, enabling the height of the main casing 2 to be further reduced. The image-forming device 1 is also configured to convey the paper P below the recording head 4 for recording and to discharge the recorded paper P from the rear end of the main casing 2. Hence, the paper P can be discharged with the recorded surface facing upward, enabling the user to confirm the recorded image easily when the discharge tray 12 is folded out.

Dust is prevented from entering the paper conveying path 13 when the top surface of the main casing 2, and particularly the image scanning device 10, is in a wide-open state because the main partitioning plate 14 (and the front cover plate 17 and the rear cover plate 18) disposed substantially on a horizontal plane is disposed to cover the top of the paper conveying path 13 through which the feeding mechanism 9 conveys paper P to the bottom of the recording unit 7. The top surface of the main partitioning plate 14 forms a support surface for supporting at least a portion of the ink supply tubes 15 so that the middle portions of the ink supply tubes 15 are supported on the top surface of the main partitioning plate 14 when the recording head 4 (the carriage 27) moves reciprocatingly, even as the middle sections of the ink supply tubes 15 near the recording head 4 bend and move left and right. Since the main partitioning plate 14 covers the top of the paper conveying path 13, the middle portions of the ink supply tubes 15 do not sag downward and interfere with the conveyed paper P, even if the ink supply tubes 15 are greatly flexible. Hence, it is not necessary to employ ink supply tubes 15 formed of a material that can meet such rigid conditions as having flexibility but not so much as to sag in the middle. It is also unnecessary to provide retainers for holding the middle portions of the ink supply tubes 15 to the main frame, thereby greatly simplifying operations for installing the ink supply tubes 15.

Further, since the vertical gap between the main partitioning plate 14 and the paper conveying path 13 can be decreased to the extreme limit while preventing the middle parts of the ink supply tubes 15 from interfering with the paper P conveyed along the paper conveying path 13, the height of the main casing 2 can be greatly reduced to achieve a more compact image-forming device 1.

Moreover, unlike devices that do not have a main partitioning plate, there is no need to provide excess space in this image-forming device 1 for allowing the ink supply tubes 15 to skirt around the paper conveying path 13.

The main partitioning plate 14, the front cover plate 17, and the rear cover plate 18 are disposed at least below the image scanning device 10 and span above the recording unit 7 and the ink accommodating unit 6. Hence, the required area projected by the main casing 2 in a plan view can be decreased while protecting a broad area between the recording unit 7, the paper conveying path 13, and the ink accommodating unit 6 from dust, even when the image scanning device 10 is opened wide as shown in FIG. 5.

Figure 6:
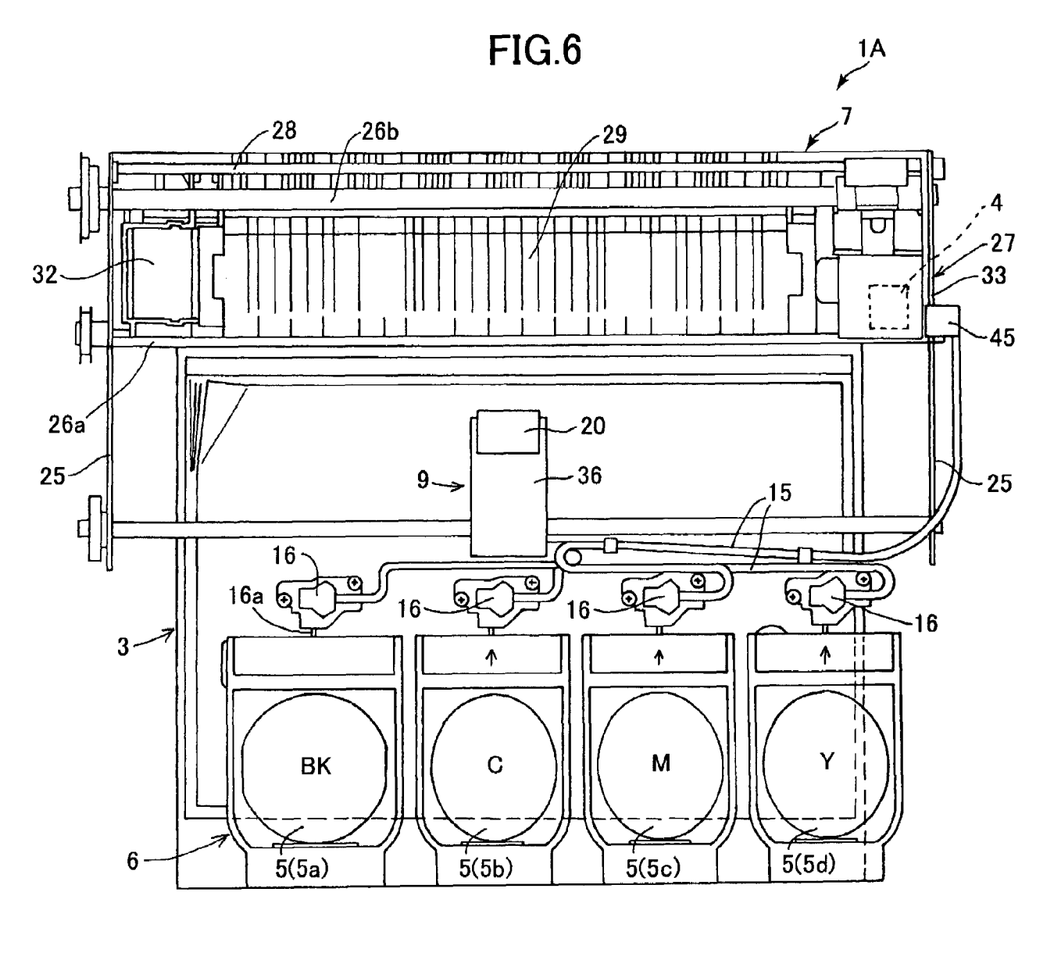
FIG. 6 is a plan view showing a recording unit of an image-forming device according to a second embodiment of the present invention.

Next, an image-forming device 1A according to a second embodiment of the present invention will be described with reference to FIG. 6. The image-forming device 1A has substantially the same construction as the image-forming device 1 of the first embodiment, but the construction of the recording unit 7 is slightly different.

In the second embodiment, an ink replenishing position is provided to the side of the maintenance unit 33, and an ink replenishing unit 45 is disposed at the ink replenishing position.

Further, two each of the ink cartridges 5 are disposed on the left and right sides of the feeding mechanism 9. The four ink supply tubes 15 corresponding to the four ink cartridges 5 are all bound together at their middle portions. The end portions of these ink supply tubes 15 are connected to the ink replenishing unit 45.

During recording operations and the like, the carriage 27 (the recording head 4) is periodically moved to the ink replenishing position. At this time, while an ink supply hole in the side of the recording head 4 is placed firmly against an ink supply unit of the ink replenishing unit 45, a buffer tank (not shown) is replenished with ink from each of the ink cartridges 5 via the ink replenishing unit 45.

As in the first embodiment, the middle portions of the ink supply tubes 15 in the second embodiment pass through the opening 34 formed in the step part 14A between the front cover plate 17 and the main partitioning plate 14 and are supported on the top surface of the main partitioning plate 14. As shown in FIG. 6, the middle portions of the ink supply tubes 15 circumvent the feeding mechanism 9 on the upstream side of the paper conveying path 13 to connect to the ink replenishing unit 45.

In the second embodiment, the ink supply tubes 15 do not move along with the reciprocating movement of the carriage 27 (the recording head 4), thereby removing the need for durability in the ink supply tubes 15 that is required when the ink supply tubes 15 are moved frequently as in the first embodiment.

While some exemplary embodiments of this invention have been described in detail, those skilled in the art will recognize that there are many possible modifications and variations which may be made in these exemplary embodiments while yet retaining many of the novel features and advantages of the invention.

For example, while the present invention is applied to a multifunction device in the embodiments described above, it is obvious that the invention may also be applied to any image-forming device provided with an inkjet recording head.

In the embodiments described above, the ink accommodating unit 6 is configured to accommodate ink cartridges 5a-5d for holding four colors of ink (BK, M, C, and Y). However, the ink accommodating unit 6 may be configured to accommodate the ink itself, without employing the ink cartridges 5. In this case, the ink supply tubes 15 may connect the ink accommodating unit 6 and the recording head 4 or the ink accommodating unit 6 and the ink replenishing unit 45. Further, the image-forming device may be configured to directly supply ink to the ink accommodating unit 6.

What is claimed is:

1. An image-forming device comprising:
   a main casing;
   a medium accommodating unit that is disposed in a bottom section of the main casing and accommodates a recording medium;
   a conveying mechanism that conveys the recording medium in a first direction;
   a recording unit that is disposed at a position higher than the medium accommodating unit and includes an inkjet head that reciprocally moves in a second direction perpendicular to the first direction;
   an ink accommodating unit disposed above the medium accommodating unit, such that at least a portion of the height dimension of the ink accommodating unit falls within the height dimension of the recording unit, the ink accommodating unit accommodating ink;

an ink supply tube through which the ink accommodated in the ink accommodating unit is supplied to the print head; and a partitioning plate that is disposed substantially horizontally and covers the top of a medium conveying path along which the recording medium is conveyed by the conveying mechanism toward the bottom of the recording unit, wherein the partitioning plate has a support surface on which at least a portion of the ink supply tube is supported, wherein the conveying mechanism is disposed between the recording unit and the ink accommodating unit and conveys the recording medium from the medium accommodating unit toward the bottom of the inkjet head.

2. The image-forming device according to claim 1, further comprising an image scanning device and a control panel that are arranged on the top of the main casing such that the recording unit, the ink accommodating unit, and the conveying mechanism are positioned within an area projected by both the image scanning device and the control panel.

3. The image-forming device according to claim 2, wherein the image scanning device and the control panel are configured to pivot together about a side of the main casing opposing the medium accommodating unit via the recording unit.

4. The image-forming device according to claim 3, further comprising a support member that supports the image scanning unit and the control panel at a pivoted position.

5. The image-forming device according to claim 3, wherein the ink accommodating unit is pivotable to expose at least a portion on the top surface of the medium accommodating unit.

6. The image-forming device according to claim 1, further comprising an image scanning device that is disposed on the top of the main casing, wherein:

the partitioning plate is disposed below the image scanning device and spanning between the top of the recording unit and the top of the ink accommodating unit;

the partitioning plate including:

a first partitioning part spanning the top of the recording unit;

a second partitioning part spanning the top of the ink accommodating unit; and a third partitioning part disposed between the first and second partitioning parts and positioned lower than the first and second partitioning parts, wherein a first step part is formed between the first and third partitioning parts, and a second step part is formed between the second and third partitioning parts;

the partitioning plate is formed with openings in the first and second step parts, the openings being elongated in the second direction;

the ink supply tube passes through the openings and constantly connects the ink accommodating unit to the inkjet head; and the third partitioning part has the support surface.

7. The image-forming device according to claim 6, wherein the conveying mechanism is disposed out of a movement range in a plan view of the ink supply tube that moves over the support surface along with the reciprocating movement of the inkjet head.

8. The image-forming device according to claim 7, wherein the ink supply tube includes a plurality of ink supply tubes disposed on the left and right sides of the conveying mechanism in a plan view;

the ink accommodating unit and the inkjet head are connected by the ink supply tubes; and the support surface and the movement range of the ink supply tubes that move over the support surface on the third partitioning part along with the reciprocating movement of the inkjet head are set to substantially overlap when projected in a plan view.

9. The image-forming device according to claim 6, wherein the third partitioning part is formed with a window through which a part of the conveying mechanism protrudes.

10. The image-forming device according to claim 9, wherein a guard piece is erected from the surface of the third partitioning plate, the guard piece surrounding the periphery of the window, preventing a middle portion of the ink supply tube from crossing over the window.

11. The image-forming device according to claim 1, further comprising an ink replenishing unit disposed at a predetermined position within a movement range of the inkjet head, the ink replenish unit replenishing the inkjet head with ink at the predetermined position, wherein the ink supply tube constantly connects the ink accommodating unit to the ink replenishing unit.

12. The image-forming device according to claim 11, further comprising an image scanning device that is disposed on the top of the main casing, wherein:

the partitioning plate is disposed below the image scanning device and spanning between the top of the recording unit and the top of the ink accommodating unit, the partitioning plate including:

a first partitioning part spanning the top of the recording unit;

a second partitioning part spanning the top of the ink accommodating unit; and a third partitioning part disposed between the first and second partitioning parts and positioned lower than the second partitioning part, wherein a step part is formed between the second and third partitioning parts;

the partitioning plate is formed with an opening in the step part, the opening being elongated in the second direction;

the ink supply tube passes through the opening and constantly connects the ink accommodating unit to the ink replenishing unit; and the third partitioning part has the support surface.

13. The image-forming device according to claim 1, wherein the main casing is formed with a discharging unit on a side of the main casing opposing the medium accommodating unit via the recording unit, and the recording medium on which the inkjet head has recorded an image is discharged out of the main casing through the discharging unit.

14. The image-forming device according to claim 13, further comprising an image scanning device that is disposed on the top of the main casing and a discharge tray that is disposed on the main casing and capable of being folded out and folded up for guiding the recording medium discharged through the discharging unit, the folded-out discharge tray guiding the recording medium substantially upward, the folded-up discharge tray guiding the recording medium onto the top surface of the image scanning device.

15. The image-forming device according to claim 1, wherein the medium accommodating unit is detachably mounted on the main casing.

16. The image-forming device according to claim 1, further comprising an ink absorber disposed in a bottom section of the main casing and lower than the medium accommodating unit.

* * * * *